US009003058B2

(12) United States Patent
Chung et al.

(10) Patent No.: US 9,003,058 B2
(45) Date of Patent: Apr. 7, 2015

(54) METHOD, SYSTEM, USER EQUIPMENT AND PROGRAM FOR DYNAMICALLY SELECTING PROXIES FOR COMMUNICATION WITH SERVERS USING KNOWN PATHS

(75) Inventors: Chit Chung, Marlboro, NJ (US); Ashish Jain, Bridgewater, NJ (US); Dennis Egan, Westfield, NJ (US); John R. Wullert, II, Martinsville, NJ (US); Hyong Sop Shim, Basking Ridge, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 420 days.

(21) Appl. No.: 13/280,726

(22) Filed: Oct. 25, 2011

(65) Prior Publication Data

US 2012/0284328 A1    Nov. 8, 2012

Related U.S. Application Data

(60) Provisional application No. 61/469,362, filed on Mar. 30, 2011.

(51) Int. Cl.
*G06F 15/173* (2006.01)
*H04W 4/00* (2009.01)
*G06F 15/16* (2006.01)
*H04L 29/08* (2006.01)

(52) U.S. Cl.
CPC ................................. *H04L 67/2833* (2013.01)

(58) Field of Classification Search
None
See application file for complete search history.

(56) References Cited

U.S. PATENT DOCUMENTS

| 7,065,066 | B2 | 6/2006 | Mizutani et al. |
| 7,499,418 | B2 | 3/2009 | Oprescu-Surcobe et al. |
| 7,681,203 | B2 * | 3/2010 | Mandato et al. ............... 719/316 |
| 8,566,142 | B2 * | 10/2013 | McCarney et al. ........... 705/7.29 |
| 2004/0162871 | A1 | 8/2004 | Pabla et al. |
| 2005/0114493 | A1 * | 5/2005 | Mandato et al. ............... 709/223 |
| 2005/0153725 | A1 | 7/2005 | Naghian et al. |
| 2006/0193283 | A1 | 8/2006 | Harris et al. |
| 2007/0149222 | A1 * | 6/2007 | Hodko et al. .................. 455/461 |
| 2008/0132175 | A1 | 6/2008 | Loeb et al. |
| 2008/0247353 | A1 | 10/2008 | Pun |
| 2009/0287922 | A1 * | 11/2009 | Herwono et al. .............. 713/155 |
| 2011/0028129 | A1 * | 2/2011 | Hutchison et al. .......... 455/414.1 |
| 2011/0137730 | A1 * | 6/2011 | McCarney et al. ......... 705/14.58 |
| 2011/0145039 | A1 * | 6/2011 | McCarney et al. ........... 705/7.32 |
| 2012/0252425 | A1 * | 10/2012 | Moeglein et al. ............. 455/418 |

FOREIGN PATENT DOCUMENTS

WO        2007/093234 A1    8/2007

OTHER PUBLICATIONS

International Application No. PCT/US2012/028171—PCT International Search Report dated May 23, 2012.

* cited by examiner

*Primary Examiner* — Ranodhi Serrao

(57) ABSTRACT

Method, User equipment, system and program for limiting an amount of information transmitted between a plurality of user equipments and a server. The method comprising establishing communication links between a plurality of user equipments based upon a proximity of the plurality of user equipments, determining a tactical common mission group selected from the linked plurality of user equipments using a mission profile stored in each of the plurality of user equipments; and selecting a proxy for the tactical common mission group. The proxy communicates with a server on behalf of the tactical common mission group. A proxy is selected based upon a ranking.

6 Claims, 9 Drawing Sheets

METHOD, SYSTEM, USER EQUIPMENT AND PROGRAM FOR DYNAMICALLY SELECTING PROXIES FOR COMMUNICATION WITH SERVERS USING KNOWN PATHS

RELATED APPLICATION

This application claims the benefit of and priority to U.S. Provisional Application Ser. No. 61/469,362 filed Mar. 30, 2011, the entirety of which is incorporated by reference as if set forth fully herein.

GOVERNMENT RIGHTS

This invention was developed in part from funding provided under DAAD19-01-C-0062 awarded by the U.S. Army. The Government has certain rights in this invention.

FIELD OF THE INVENTION

This invention relates to mobile devices, communication systems and information limiting processing.

BACKGROUND

Mobile communication devices, such mobile or cellular telephones have become commonplace in today's society. Most mobile telephones are no longer just used as a telephone device; rather these devices have much more sophisticated applications. For example, a mobile device can periodically transmit informational updates to a server.

However, while the updates from the mobile communication devices to the server provide variable information, the updates can overload the server and the communication link there between. The overload can increase the processing power needed to process the update and increase the number of resources needed, such as storage space. Additionally, the overload can cause network interference and an increase in bandwidth needed. These problems can be prohibitive as the size of the update increases.

SUMMARY OF THE INVENTION

Accordingly, disclosed is a method for limiting an amount of information transmitted between a plurality of user equipments and a server. The method comprises establishing communication links between a plurality of user equipments based upon a proximity of the plurality of user equipments, determining a tactical common mission group selected from the linked plurality of user equipments using a mission profile stored in each of the plurality of user equipments and selecting a proxy for the tactical common mission group for subsequent communication with a server on behalf of the tactical common mission group based upon a ranking.

The selecting comprises computing mission vectors and a ranking using a preset ranking criterion and transmitting the ranking to other user equipment(s) in the tactical common mission group.

If the user equipment is not selected as a proxy, the method further comprises de-activating mission processing and replacing an identifier of a server with an identifier of the proxy.

The location information is only transmitted by the proxy to the server. The proxy transmits update information to the server; the update information includes identifiers corresponding to each of the plurality of user equipment to indicate that the proxy is acting on behalf of the tactical common mission group.

Also disclosed is an user equipment used for wireless communication comprising: a wireless transceiver for initially transmitting a user equipment discovery message, receiving messages from each discovered user equipment, the messages including mission identifier and a ranking corresponding to each discovered user equipment and transmitting a message to each discovered user equipment containing a mission identifier and a ranking corresponding to the user equipment; a storage device configured to store at least one mission profile including the mission identifier and a preset ranking criterion corresponding to the user equipment, a processor configured to when executing a program stored in the storage device provide a group controller for establishing a communication link between each discovered user equipment and the user equipment, the communication link is based a proximity of user equipment and a mission controller for determining whether to create or join a tactical common mission group based upon the mission identifier in the at least one mission profile stored in the storage device of the user equipment and the mission identifiers contained in the messages received by the user equipment from the coupled user equipment, computing mission vectors and a ranking based upon the preset ranking criterion, and determining whether the user equipment is a proxy for the tactical common mission group for subsequent communication with a server on behalf of the communication mission group based upon the computed ranking and rankings in the messages received from each discovered user equipment.

The wireless transceiver transmits mission information to the server when the user equipment is the proxy. The wireless transceiver ceases transmission of mission information to the server when the user equipment is not determined to be the proxy. When the user equipment becomes unlinked from the discovered user equipment, the wireless transceiver restarts the transmission of the mission information to the server.

A computer readable storage medium having a computer program for causing a computer to execute a method for limiting an amount of information transmitted between a plurality of user equipments and a server the method comprising establishing communication links between a plurality of user equipments based upon a proximity of the plurality of user equipments, determining a tactical common mission group selected from the linked plurality of user equipments using a mission profile stored in each of the plurality of user equipments and selecting a proxy for the tactical common mission group for subsequent communication with a server on behalf of the tactical common mission group based upon a ranking.

BRIEF DESCRIPTION OF THE DRAWINGS

These and other features, benefits, and advantages of the present invention will become apparent by reference to the following figures, with like reference numbers referring to like structures across the views, wherein.

DETAILED DESCRIPTION OF THE INVENTION

Definitions

For purposes of the description in this application the following definitions shall apply:

"Update" shall mean a transmission of information from user equipment to a server.

"Server" shall mean any centralized application device that receives updates from a plurality of user equipments.

"User equipment (UE)" shall mean any device capable of transmitting an update such as a mobile wireless device.

"Mission" shall mean an application or group of applications the serves a function. A mission can be, but is not limited to a tracking application to relate GPS information to a server, playing an online game, using an online website to download a video, or using an application store to download an application, etc.

"Common Mission" shall mean multiple user equipment running the same mission.

"Co-located" means within the range of the short range access network protocol.

Figure 1:
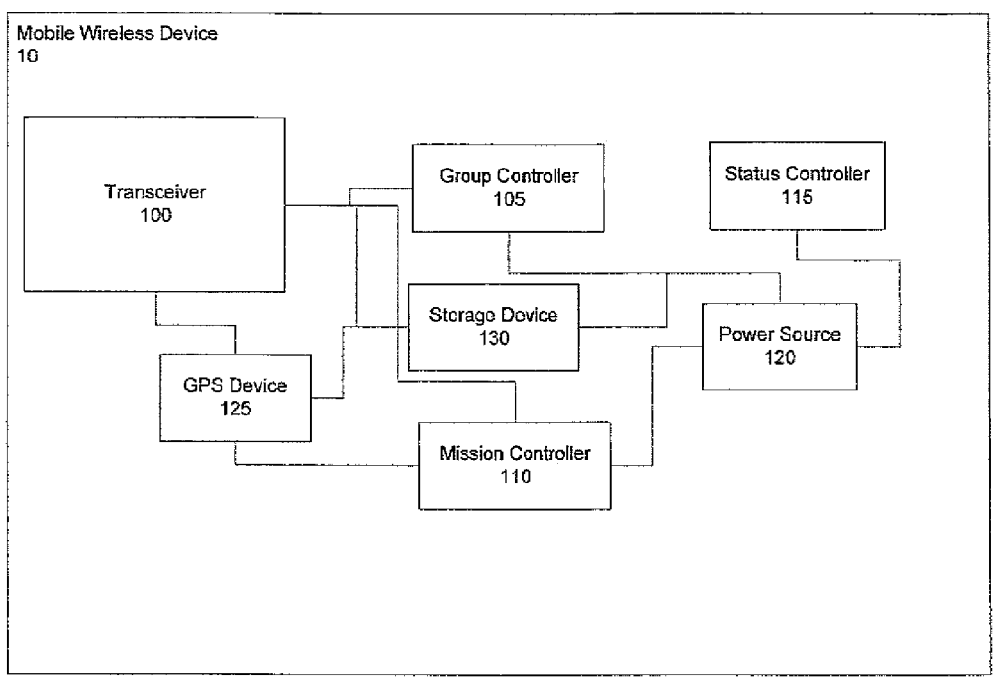
FIG. 1 illustrates exemplary user equipment in accordance with the invention.

FIG. 1 illustrates an exemplary user equipment, e.g., mobile wireless device 10, in accordance with the invention. The mobile wireless device 10 is configured to transmit and receive data using a transceiver 100 have multiple access protocols such as a short range, medium range and long range protocol. The short range protocol can be Bluetooth. The medium range protocol can be WiFi and the long range protocol can be cellular. The mobile wireless device 10 can communicate directly or indirectly with a server 20. In accordance with the invention, co-located mobile wireless devices are grouped together based upon a common mission for purposes of limiting updates being transmitted to the server 20. For example, when a group of mobile wireless devices 10 are co-located and have the same mission, an information map can be created for the group as a whole from a single stream of data to a server 20, rather than multiple streams sent to the server 20 from all the mobile wireless devices 10. The update may include any device sensor data such as location, altitude, temperature, pressure, picture, audio and video.

The mobile wireless device 10 includes a group controller 105, a mission controller 110 and a status controller 115. The group controller 105 is configured to identify co-located mobile wireless devices and establish a communication link. The group controller 105 uses the transceiver 100 to automatically discover other mobile wireless devices 10 within the short range access network protocol, e.g., using Bluetooth Service Discovery Protocol (SDP). A device identifier is exchanged between co-located mobile wireless devices. The communication link exists as long as the mobile wireless devices are within the proximity of the small range access network protocol.

The mission controller 110 is configured to determine a tactical common mission group from among the co-located and linked mobile wireless devices. The mission controller 110 examines a mission identifier and groups all co-located and linked moving wireless devices 10 having the same mission. The mission controller 110 is also configured to select a proxy for the group based upon at least one ranking method. The selection of the proxy will be described later in detail.

The status controller 115 is configured to control a mode of operation of the mission controller 110. There are two modes of operation: manual confirmation mode and automatic common mission mode. In manual confirmation mode, prior to being grouped into a tactical common mission group 30, the user of the mobile wireless device 10 must manually confirm the desire to join. Depending on the type of device, the mission and device plan, the manual confirmation mode can be a default setting.

The group controller 105, the mission controller 110 and status controller 115 can be three separate controllers. Alternatively, the controllers can be integrated into one controller.

The mobile wireless device 10 includes a power source 120 such as a battery. The battery can be rechargeable. The state of charge (SOC) of the power source 120 is continuously monitored by the mission controller 110 and can be used to select the proxy as will be described later in detail.

The mobile wireless device 10 further includes a GPS device 125 for providing location information.

The mobile wireless device 10 includes a storage device 130. The storage device 130 is configured to store programs containing execution instructions for performing the methods described herein. Additionally, the storage device 130 includes at least one mission profile. Each mission profile is indexed or identified by a globally unique id (MID) and consists of a number of Mission Identifying Attributes (MIA), including, but not limited to the mission name, service provider servers (servers 20), application name, description, a set of properties P and ranking attributes called the Mission Objective Vector (MOV) and Ranking Algorithm (RA), etc. The properties and ranking attributes are used by the Mission Controller 110 to compute mission properties including a Mission Rank (MR). The mission properties include a time period between consecutive updates. The ranking algorithm or method is a preset criterion used to rank the mobile wireless device 10 against other linked mobile wireless devices within the tactical common mission group.

The mission profiles can be preloaded into the mobile wireless devices 10. Additionally, the mission profiles can be updated regularly and in real time as new mission profiles are defined.

Additionally, not shown in the figures, the mobile wireless device 10 includes an application controller for controlling the local applications, a keypad, a display, a speaker and other circuit components commonly used is mobile wireless devices 10 such as a smart phone. These components are well known and will not be described in detail herein. The local applications are used in support of the mission and generate the update information. The updates can include the types of applications currently running, the activity currently being performed, biometric data, biological data, information related to photographs taken by the camera, networks seen, and access point connectivity.

Figure 2A:
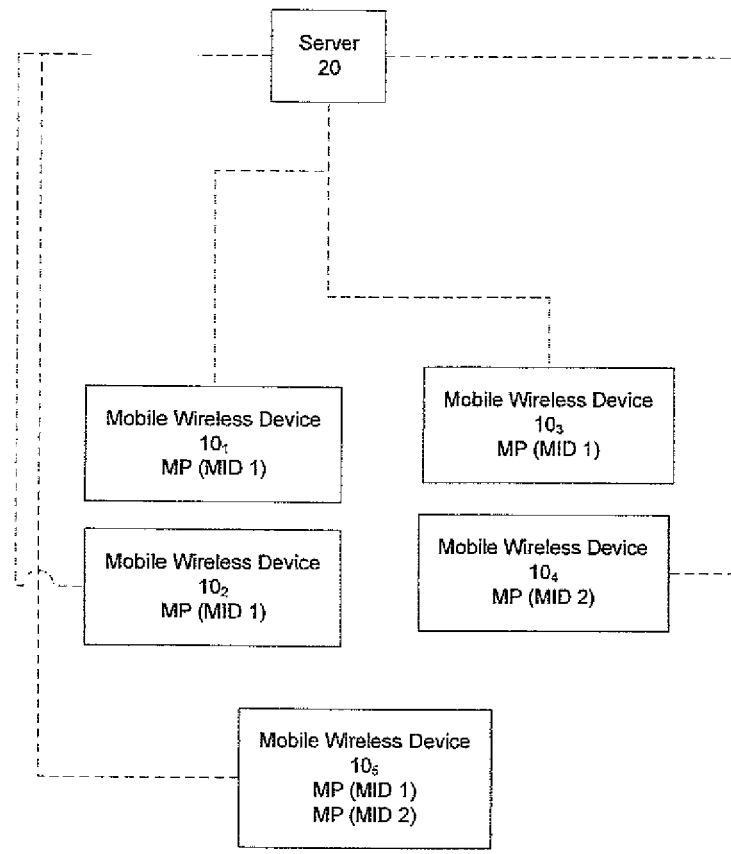
FIGS. 2A-2F illustrate an example of the formation of co-located groups of user equipment and tactical common mission groups from co-located user equipment in accordance with the invention.
Figure 2B:
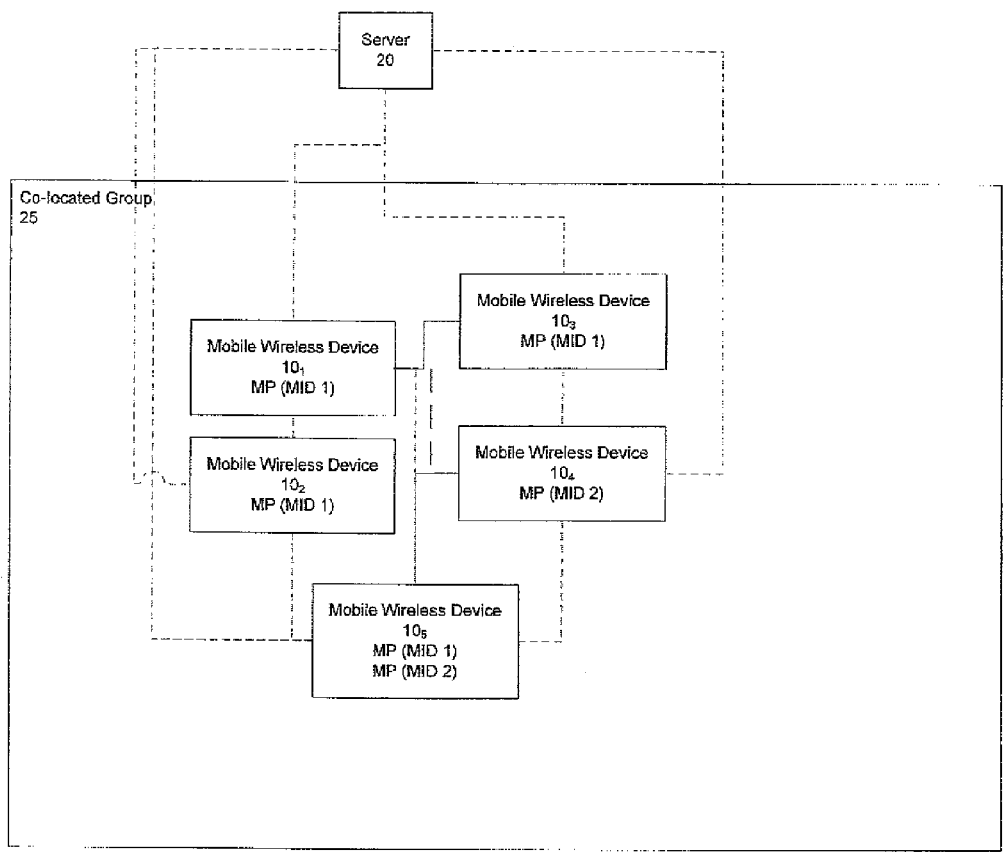
Figure 2C:
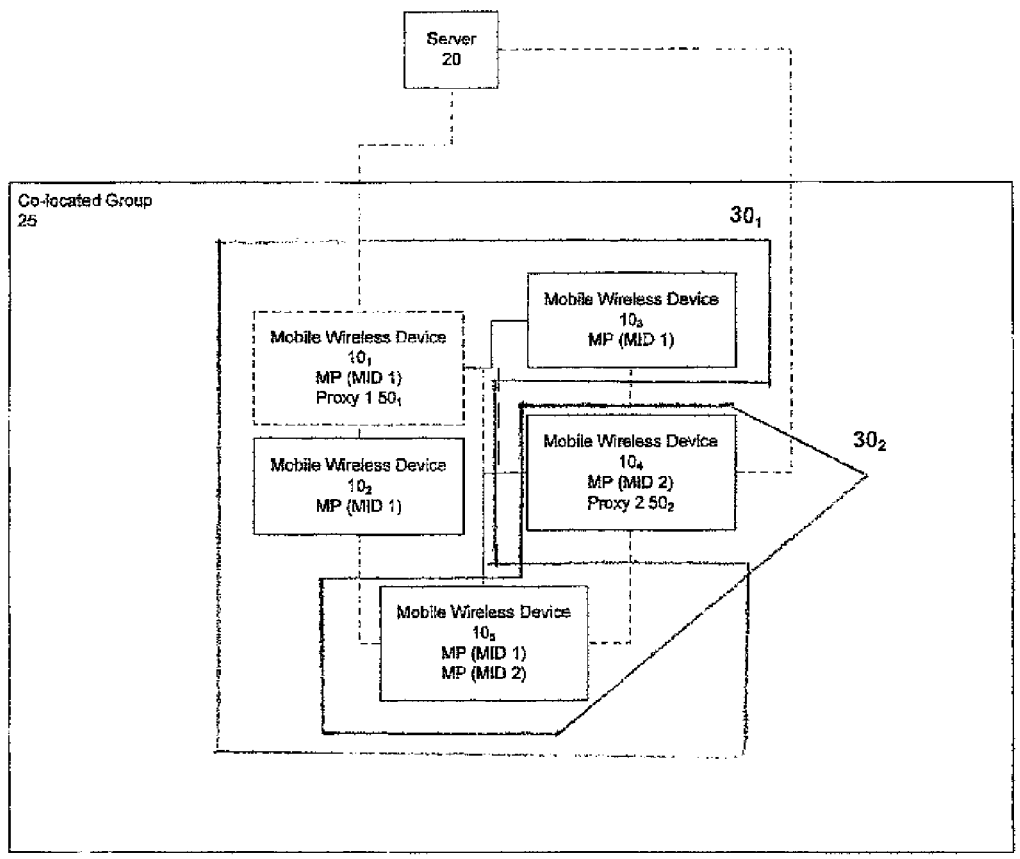
Figure 2D:
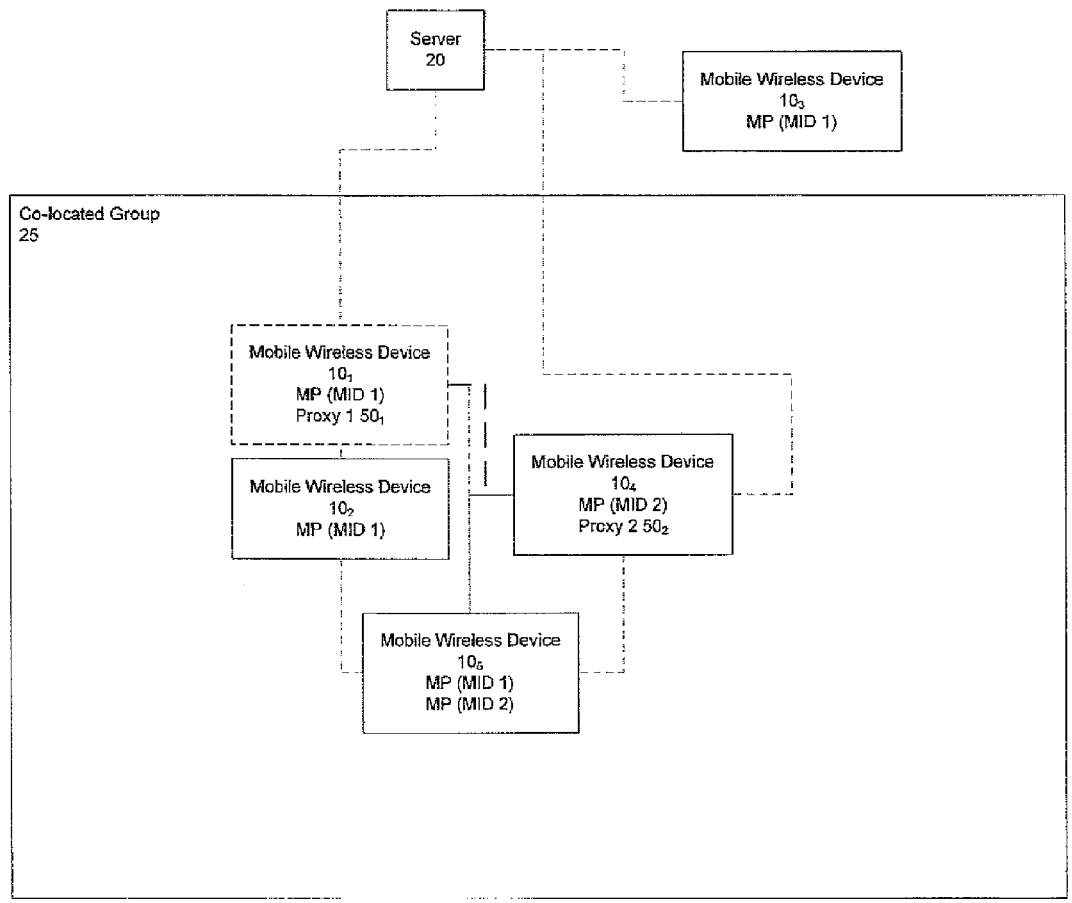
Figure 2E:
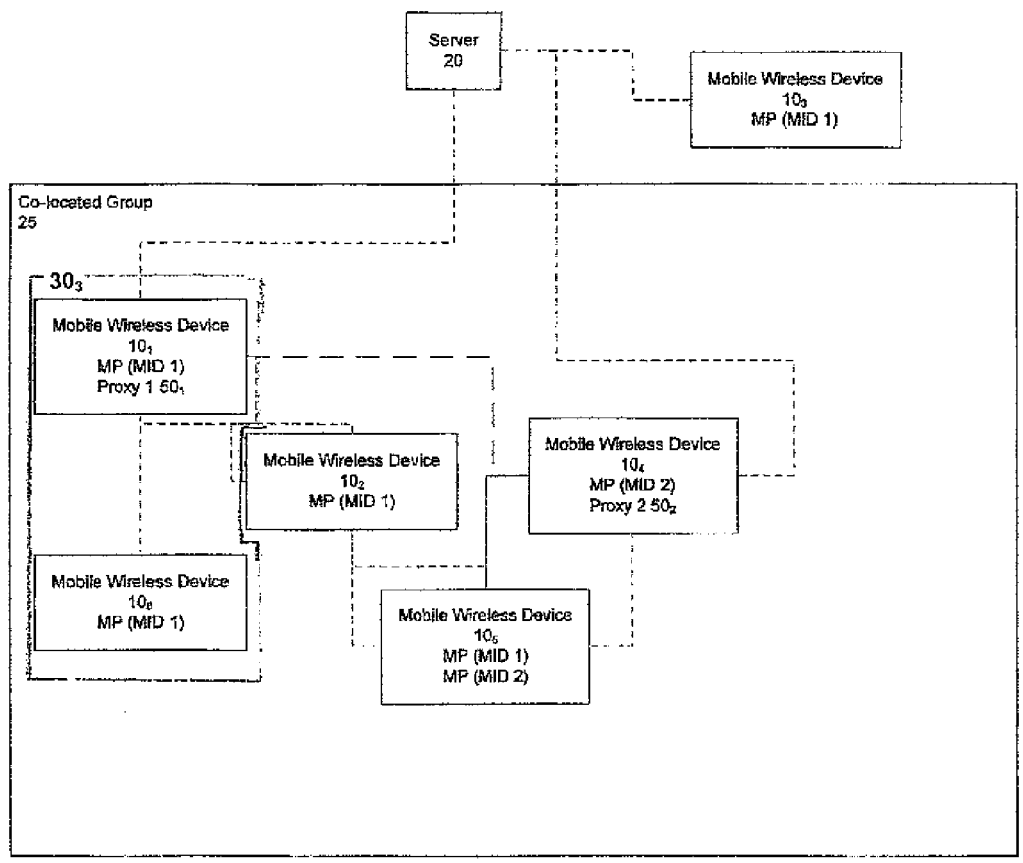
Figure 2F:
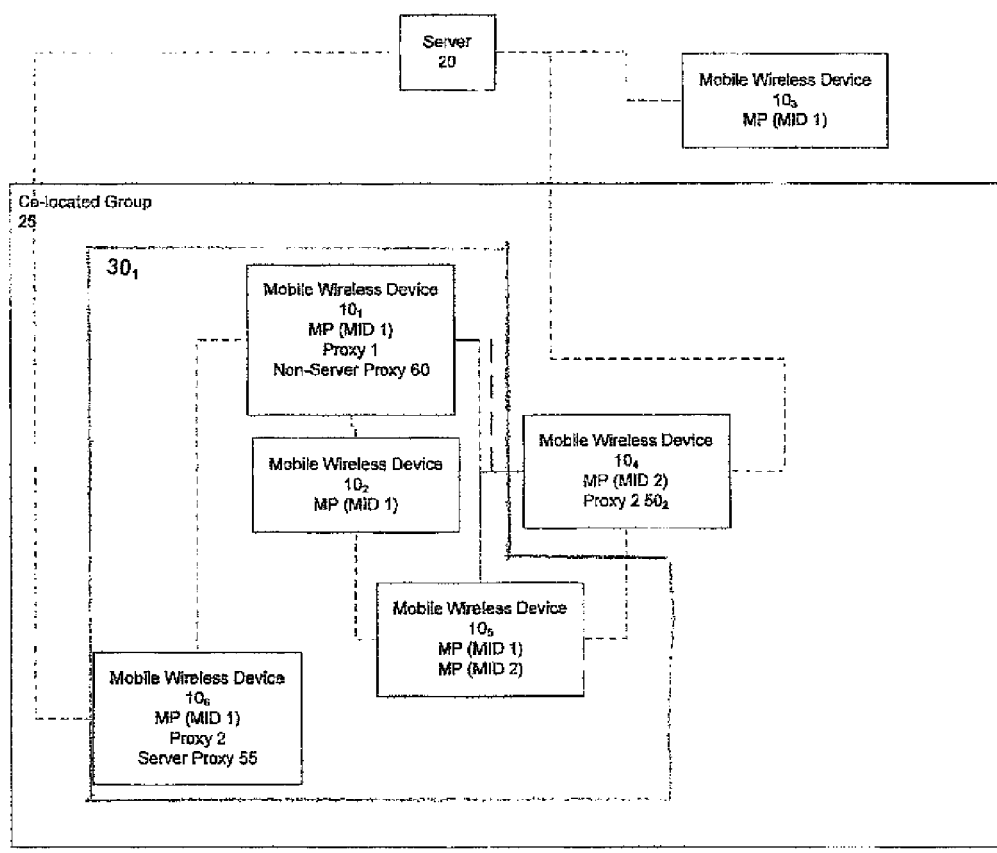
Figure 3:
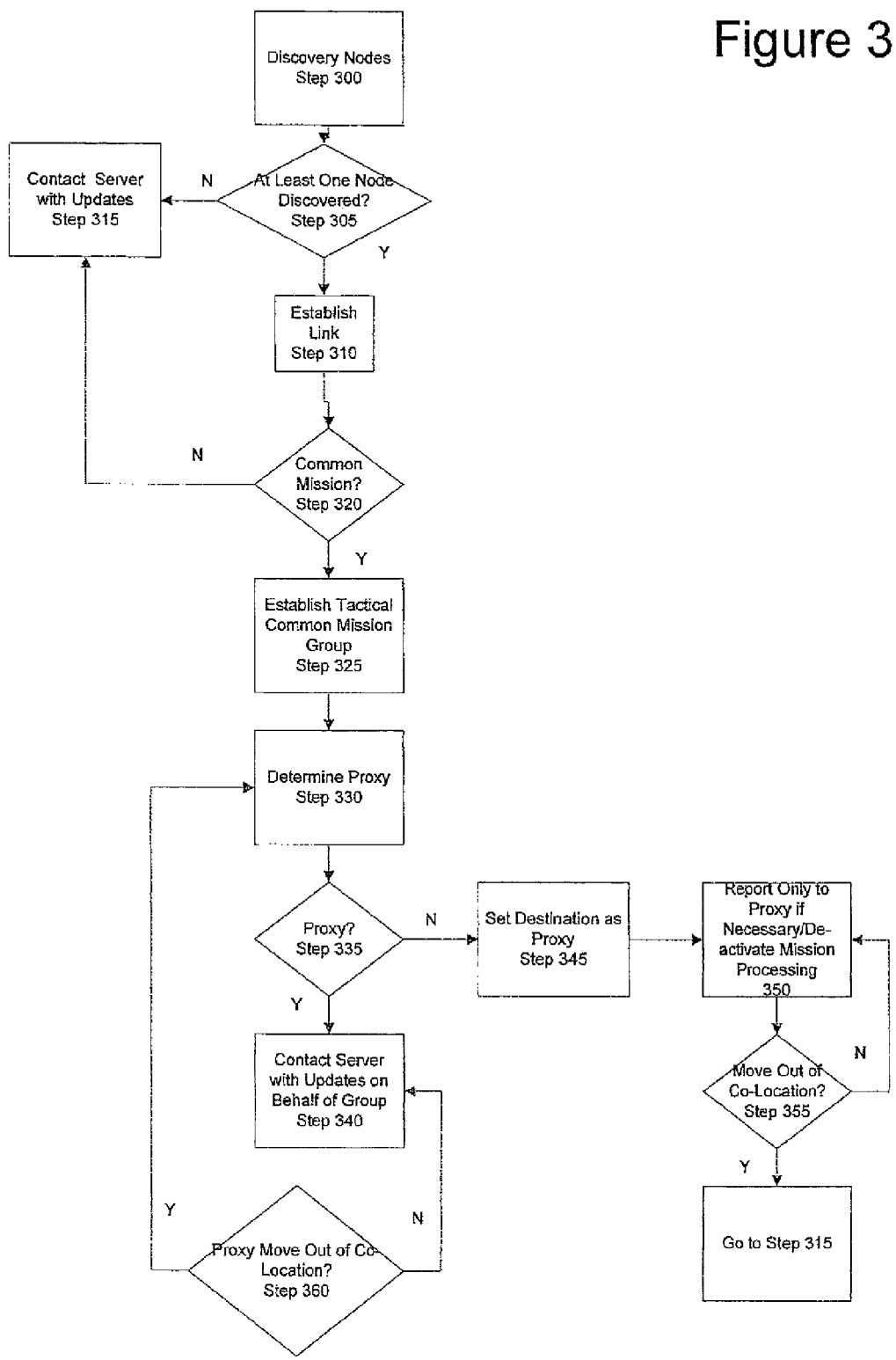
FIG. 3 illustrates a flow chart for an exemplary method for limiting information sent to a server in accordance with the invention.

An exemplary method for limiting information sent to a server 20 in accordance with the invention will be described with respect to the flow chart in FIG. 3 and the example of the formation of co-located groups of user equipment and tactical common mission groups from co-located user equipment as depicted in FIGS. 2A-2D (FIGS. 2E and 2F will be described later).

Initially, each mobile wireless device 10 ($10_1$-$10_5$ in FIGS. 2A-2D) is ungrouped and therefore, each mobile wireless device 10 transmits update information to the server 20. The transmission of information and a communication link is depicted in the figures by dashed lines. Each mobile wireless device 10 includes its own mission profile. For the example depicted in FIGS. 2A-2D, mobile wireless devices $10_1$-$10_3$ and $10_5$ have the same mission, MID=1 (mission profile is referenced as MP). Mobile wireless devices $10_4$ and $10_5$ have the same mission MID=2. Mobile wireless devices $10_4$ has two mission profiles MID=1 and MID=2. A mobile wireless device 10 can have multiple mission profiles.

At step 300, co-located mobile wireless devices are discovered, i.e., node discovery. Each device's group controller 105 can discover other devices in local proximity and within range of the short range access network protocol. For example, the short range access network protocol is used to discovery all mobile wireless devices $10_n$ within close proximity of the transmitting mobile wireless device. The transceiver 100 can be configured with Bonjour using DNS. Alternatively, the transceiver 100 can be configured with a Bluetooth Service Discovery Protocol (SDP). At step 305, the group controller 105 determines if at least one mobile wireless device was discovered, e.g., a message received from another mobile wireless device. The message includes the identifier of the mobile wireless device 10.

If no message is received ("N" at step 305), the mobile wireless device 10 maintains a communication link directly with the server 20 at step 315. Update information is subsequently transmitted to the server 20 by each mobile wireless device 10 (remains ungrouped). If a message is received ("Y" at step 305), the group controller 105 establishes a communication link at step 310. FIG. 2B illustrates communication links between each of the five mobile wireless devices $10_{1-5}$. The grouped devices are referenced as co-located group 25.

Not all of the co-located group 25 (e.g., $10_{1-5}$) become members of the tactical common mission group, but only co-located devices with a common mission as indicated by the MID. At step 320, the mission controller 110 determines if there is a common mission among the mobile wireless devices ($10_{1-5}$) within the co-located group 25. When a communication link is established, each mobile wireless device 10 transmits its identifier and the MID. The mission controller 110 compares the received MIDs and its own. If there is no match ("N" at step 320), then mobile wireless device 10 maintains a communication link directly with the server 20 at step 315. Update information is subsequently transmitted to the server 20 by the mobile wireless device 10 (no tactical common mission group). If there is a match ("Y" at step 320), the mission controller 100 establishes a tactical common mission group 30 with all mobile wireless devices having the same mission at step 325. FIG. 2C illustrates two tactical common mission groups $30_1$ and $30_2$, respectively. Tactical common mission group $30_1$ is for MID 1 and tactical common mission group $30_2$ is for MID=2. Mobile wireless devices $10_5$ has two mission profiles MID=1 and MID=2 and therefore, can be a member of both tactical common mission groups $30_1$ and $30_2$. FIG. 2C show mobile wireless device $10_5$ as a member of both groups $30_1$ and $30_2$. The mobile wireless device $10_5$ can be running multiple applications (different applications) to support different missions. This is the reason why the mobile wireless device $10_5$ is in both groups.

Figure 4:
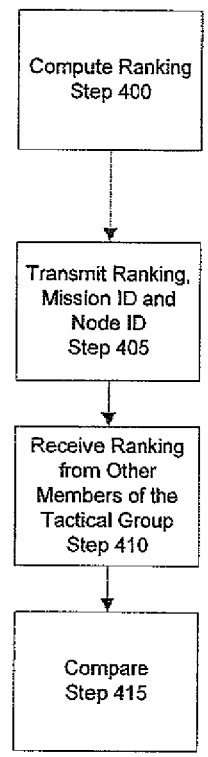
FIG. 4 illustrates a flow chart for an exemplary method for selecting one or more proxies in accordance with the invention.

The mission controller 110 then determines a proxy for the tactical common mission group 30. The proxy is used to transmit all subsequent updates to the server 20 at step 340. FIG. 4 illustrates a flow chart for determining the proxy.

When a common mission is detected, the mission controller 110 computes the MOV properties and ranks itself using the ranking method in the mission profile resulting in a Mission Rank (MR) at step 400. For example, mobile wireless devices $10_1$-$10_3$ and $10_5$ have the same mission and each would calculate the MR.

The mission controller 110 can use a battery power to determine the ranking, e.g., MR. As stated above, the mission controller 110 continuously monitors the state of charge (SOC) of the power source. The ranking can be a numerical representation of the SOC. Devices with the higher state of charge would have a higher ranking.

Alternatively, the mission controller 110 can monitor other operational parameters and current conditions of the mobile wireless device 10 to determine the ranking. For example, the capability of a processor or storage device 130 can be used. Alternatively, the available capacity of the processor or storage device 130 can be used. The ranking can be a numerical representation of available capacity. The more powerful devices would have a higher ranking. For example, a moving vehicle with the mobile wireless device 10 embedded therein would have a higher ranking the hand-held cellular device.

Alternatively, the mission controller 110 can use the access network protocol as a basis for determining the ranking. The mobile wireless device 10 with the most suitable communications access network would have the highest ranking. The ranking would be a numerical representation of the suitability. The suitability can be mission specific. For example, using speed and bandwidth as suitability, then a mobile wireless device 10 communicating using 802.11n would have a higher ranking than a mobile wireless device 10 communicating using 802.11g or 3G. However, the fastest speed may not be the best for some missions. 802.11b uses unregulated radio signaling frequency (2.4 GHz) bandwidth and has speed up to 11 Mbps. 802.11a uses regulated frequency (5 GHz) bandwidth and has a speed up to 54 Mbps. Bandwidth may be more important in some missions than others. Regulated frequency incurs less interference but offers shorter range that is more easily obstructed.

Alternatively, the mission controller 110 can use a numerical representation of the importance of the owner of the mobile wireless device, or user of the mobile wireless device or type of the device 10 as a basis for the ranking. For example, if the mobile wireless device 10 is embedded in a vehicle then it can outrank a personal device. Additionally, a captain can outrank a Corporal. Furthermore, tracking a critically wounded person may outrank anyone else. The ranking can therefore change based upon a physical condition of the user. If the user is injured, the user can manually enter the condition. If manually entered, the ranking can immediately change overriding other ranking conditions.

Alternatively, the ranking can be randomly determined. The mission controller 110 can include a pseudo-random number generator. The ranking would be the result of the generator.

Alternatively, any of the above ranking methods can be combined. For example, both the state of charge and the available capacity of the device can be used for ranking. The parameters can also be weighted. The weights can be preset and are mission specific. Alternatively, the weights can be dynamically varied to optimize usefulness.

Each mobile wireless device 10 in the tactical common mission group 30 transmits this MR and its identifier to other devices in the group 30 at step 405 and receives the MR and identifiers of the other devices in the group 30 at step 410. All of the MRs are compared at step 415. The mobile wireless device 10 with the highest rank will act as the proxy 50 for the group 30 and conducts the mission on behalf of the tactical common mission group 30. As depicted in FIG. 2C, mobile wireless device $10_1$ is the proxy $50_1$ for tactical common mission group $30_1$ and mobile wireless device $10_4$ is the proxy $50_2$ for tactical common mission group $30_2$.

At step 335, the mobile wireless device 10 determines if it is the proxy 50. If it is the proxy 50 ("Y") at step 335, it sets itself as the proxy 50 and maintains an active status and connection with the server 20.

The proxy 50 advertises itself as the proxy. This advertisement can be periodic. Subsequently, the proxy 50 will contact the server 20 on behalf of the tactical common mission group 30 and provide the server 20 with mission updates and location information, at step 340. For example, as depicted in FIG. 2C, only mobile wireless devices $10_1$ and $10_4$ directly communicate with the server 20. The proxy 50 will also transmit the identifiers of the other members of the tactical common mission group 30 to the server 20 to indicate that the proxy 50 is acting on behalf of all of the members of the tactical common mission group 30. By having the proxy 50 conduct the mission on behalf of the tactical common mission group 30 with the server, the number of communication channels is reduced thus reducing any detectable footprint. This is also useful for deception where the number of actual mobile wireless devices 10 is greater than the number of proxies 50.

A new proxy 50 for the tactical common mission group 30 is selected if the current proxy moves out of the co-located area. At step 360, the mobile wireless device 10 determines if the proxy has moved out of the area. The determination can be based upon not receiving an advertisement from the proxy 50 after a predetermined period of time. The period of time can be set as a multiple of the advertisement period. If the proxy 50 has moved out of the co-located area ("Y" at step 355), then a new proxy is selected, i.e., process returns to step 330. The current proxy remains the proxy 50 for the tactical common mission group 30 as long as the proxy 50 is co-located ("N" at step 360).

All mobile wireless devices 10 that are not selected as the proxy 50 ("N" at step 335) cease mission processing with the server 20 and replace the server 20 with the proxy address as a destination for all subsequent messages at step 345. If any information needs to be transmitted to the server 20, the non-selected mobile wireless devices transmit the information to the proxy 50, at step 350. The non-selected mobile wireless devices will only communicate with the proxy 50. The mobile wireless devices 10 monitor the relative location of the devices to the proxy 50 at step 355. If a mobile wireless device 10 moves out of the co-located area ("Y" at step 355), the mobile wireless device 10 will reestablish direct communication with the server 20, i.e., return to step 315. As long as the mobile wireless devices 10 are co-located with the proxy 50 ("N" at step 355), the mobile wireless devices 10 will not directly communicate with the server 20. For example, as depicted in FIG. 2D, mobile wireless device $10_3$ moved out of the co-located area. Thus, the mobile wireless device $10_3$ is depicted as directly communicating with the server 20.

If a new device 10 becomes co-located with Co-located Group 25 consisting of an already formed tactical common mission group 30 and other non-grouped devices, the new device may form a new group with other non-grouped devices 10 (if these exist), or alternatively with the proxy of the co-located group 25. In the former, the non-grouped devices will form a new tactical common mission group 30 in the manner as described above. The existing proxy 50 does not change and the existing tactical common mission group 30 also does not change because a new group is formed.

In the latter, the new device(s), e.g., mobile wireless device $10_6$ (FIG. 2E) and the proxy $50_1$ may form a tactical common mission group $30_3$ also in the same manner as described. FIG. 2E shows the new tactical common mission group $30_3$ for exemplary purposes only. The existing tactical common mission groups 30 still are formed (not illustrated). If the existing proxy (proxy 1) is still selected as the proxy 50 with the new device(s) then the new devices act just like any existing non-proxies and proxy 1, e.g., proxy $50_1$ transmits information to the server 20 on behalf of all non-proxies. All non-selected devices transmit to the proxy 50.

However, if a new proxy (proxy 2) from a new device e.g., mobile wireless device $10_6$ (FIG. 2F) is chosen because of better mission optimization, proxy 1 will cease transmission to the server 20 and instead transmits its information to proxy 2, the server proxy 55. FIG. 2F shows the new tactical common mission group $30_1$ for exemplary purposes only. The existing tactical common mission groups 30 still are formed (not illustrated). Proxy 1 and its non-selected devices act as one. Proxy 1 is a non-server proxy 60 whereas proxy 2 is a server proxy 55. The server 20 is still aware of all of the devices 10 in the tactical common mission group $30_1$ because non-server 60 and server proxies 55 transmit information on behalf of its non-proxy devices. Thus, for each tactical common mission group 30 there is only one server proxy 55 but may have many non-server proxies 60.

As described above, only one proxy 50 is selected for each tactical common mission group 30. However, multiple proxies can be specified and useful for a variety of reasons. For example, a mission profile can limit the number of devices in a group. If N proxies are allowed by the mission, N mobile wireless devices 10 will be selected. The number of proxies is determined from the mission profile.

Each of the proxies will be selected in accordance will the selection described in FIG. 4. The top N mobile wireless devices 10 according to the MR will be selected. Once each of the proxies is selected, the proxies will advertise their status. All of the non-selected mobile wireless devices will join a sub-group within the tactical common mission group 30. Each sub-group will have one proxy 50. Each sub-group is identified by an identifier. For example, the identifier can be based upon the ranking of all of the proxies. The proxy 50 with the highest ranking is a member of sub-group 1, the proxy 50 with the second highest ranking is a member of sub-group 2, etc. If 2 or more proxies 50 have the same ranking, then the sub-group membership determined based upon a device identifier such as, but not limited to device serial number, MAC address or Universal Device Identifier (UDID). The mission profile specifies the selection parameter from the above list. The non-selected mobile wireless devices will determine which sub-group to join based upon their ranking and the identifier of the sub-group. For example, an X modulo N+1 algorithm can be used. The number of devices is each sub-group does not have to be the same.

As described herein, mobile wireless devices 10 remain in a tactical common mission group 30 as long as they are in a co-located area. Alternatively, the mobile wireless devices 10 can remain in the tactical common mission group 30 for a predetermined period of time.

As will be appreciated by one skilled in the art, the present invention may be embodied as a system, device(s), method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "system."

Various aspects of the present invention may be embodied as a program, software, or computer instructions embodied or stored in a computer or machine usable or readable medium, which causes the computer or machine to perform the steps of the method when executed on the computer, processor, and/or machine. A computer readable medium, tangibly embodying a program of instructions executable by the machine to perform various functionalities and methods described in the present invention is also provided.

The devices, system, method and program of the present invention may be implemented and run on a general-purpose computer or special-purpose computer system. The computer system may be any type of known or will be known systems such as, but not limited to, a virtual computer system and may typically include a processor, memory device, a storage device, input/output devices, internal buses, and/or a communications interface for communicating with other computer systems in conjunction with communication hardware and software, etc.

The computer readable medium could be a computer readable storage medium or a computer readable signal medium. Regarding a computer readable storage medium, it may be, for example, a magnetic, optical, electronic, electromagnetic, infrared, or semiconductor system, apparatus, or device, or any suitable combination of the foregoing; however, the computer readable storage medium is not limited to these examples. Additional particular examples of the computer readable storage medium can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an electrical connection having one or more wires, an optical fiber, an optical storage device, or any appropriate combination of the foregoing; however, the computer readable storage medium is also not limited to these examples. Any tangible medium that can contain, or store a program for use by or in connection with an instruction execution system, apparatus, or device could be a computer readable storage medium.

The terms "devices" "server" and "network" as may be used in the present invention may include a variety of combinations of fixed and/or portable computer hardware, software, peripherals, and storage devices. The system may include a plurality of individual components that are networked or otherwise linked to perform collaboratively, or may include one or more stand-alone components. The hardware and software components of the computer system of the present application may include and may be included within fixed and portable devices such as desktop, laptop, and/or server, and network of servers (cloud).

The above description provides illustrative examples and it should not be construed that the present invention is limited to these particular example. Thus, various changes and modifications may be effected by one skilled in the art without departing from the spirit or scope of the invention as defined in the appended claims.

What is claimed is:

1. A user equipment used for wireless communication comprising:
   a wireless transceiver for initially transmitting a user equipment discovery message, receiving messages from each discovered user equipment, the messages including mission identifier and a ranking corresponding to each discovered user equipment and transmitting a message to each discovered user equipment containing a mission identifier and a ranking corresponding to the user equipment;
   a storage device configured to store at least one mission profile including the mission identifier and a preset ranking criterion corresponding to the user equipment;
   a processor configured to when executing a program stored in the storage device provide
      a group controller for establishing a communication link between each discovered user equipment and the user equipment, the communication link is based a proximity of user equipment; and
      a mission controller for determining whether to create or join a tactical common mission group based upon the mission identifier in the at least one mission profile stored in the storage device of the user equipment and the mission identifiers contained in the messages received by the user equipment from the coupled user equipment, computing mission vectors and a ranking based upon the preset ranking criterion, and determining whether the user equipment is a proxy for the tactical common mission group for subsequent communication with a server on behalf of the communication mission group based upon the computed ranking and rankings in the messages received from each discovered user equipment.

2. The user equipment used for wireless communication of claim 1, wherein the wireless transceiver transmits mission information to the server when the user equipment is the proxy.

3. The user equipment used for wireless communication of claim 1, wherein the wireless transceiver ceases transmission of mission information to the server when the user equipment is not determined to be the proxy.

4. The user equipment used for wireless communication of claim 3, wherein when the user equipment becomes unlinked from the discovered user equipment, the wireless transceiver restarts the transmission of the mission information to the server.

5. The user equipment used for wireless communication of claim 1, wherein the wireless transceiver is configured with multiple access network protocols including a short range access protocol and a wifi protocol.

6. The user equipment used for wireless communication of claim 5, wherein the short range access protocol is used for user equipment discovery.

* * * * *